UNITED STATES PATENT OFFICE.

THOMAS J. MAYALL, OF BOSTON, MASSACHUSETTS.

IMPROVEMENT IN PROCESSES FOR THE MANUFACTURE OF INDIA-RUBBER HOSE.

Specification forming part of Letters Patent No. 26,276, dated November 29, 1859; reissue No. 5,111, dated October 22, 1872; extended seven years; reissue No. 6,545, dated July 13, 1875; application filed December 15, 1873.

*To all whom it may concern:*

Be it known that I, THOMAS J. MAYALL, formerly of Roxbury, in the county of Norfolk and State of Massachusetts, now of Boston, Suffolk county, Massachusetts, have invented a new and useful Improvement in the Manufacture of India-Rubber Hose or Tubing, of which the following is a full and exact description:

The object of my invention is an india-rubber hose whose durability will not be impaired by the premature decay of the canvas, upon which its strength depends.

The india-rubber hose or tubing in common use previous to my improvement is composed of layers of canvas coated with india-rubber and vulcanized, the art of making which is well known. The trouble in the use of this hose arises from the fact that the canvas decays rapidly, either in consequence of being wet or of the effect of the sulphur with which the rubber is vulcanized, and the hose becomes unable to endure the water-pressure to which it is subjected. I have discovered how this trouble may be averted and a hose produced which will not prematurely decay.

The mode I employ is to treat the fibrous fabric, on which the strength of the hose depends, with antiseptics, either by immersing the fabric in the antiseptic and afterward drying it, or by placing it in any suitable vessel and exhausting the air, so that the antiseptic will be forced in by pressure, or in any other proper manner.

The best antiseptic known to me is the dead-oil of tar, or crude carbolic acid, as it is sometimes called, obtained in the destructive distillation of carbonaceous substances.

I find that a solution containing from thirty (30) to forty (40) per cent. of carbolic acid operates well in the preparation of my antiseptic hose.

Having thus described my improvement, I state my claim as follows:

1. In india-rubber hose, the application of the preservative compound herein mentioned, or an equivalent antiseptic, so as to preserve the same, substantially as described.

2. The improved india-rubber hose prepared by combining the substance herein named, or an equivalent antiseptic, with the fibrous material of the same, substantially as described.

THOS. J. MAYALL.

Witnesses:

J. E. MAYNADIER,

A. POLLOK.